United States Patent Office 2,694,664
Patented Nov. 16, 1954

2,694,664

CHOLINE AND INOSITOL PREPARATION CONTAINING A SURFACE-ACTIVE AGENT

Michael R. Maiese, Brooklyn, N. Y., assignor to American Home Products Corporation, New York, N. Y., a corporation of Delaware No Drawing. Application November 19, 1951,
Serial No. 257,173

5 Claims. (Cl. 167—55)

This invention relates to a choline and inositol preparation containing a surface-active agent.

One of the serious degenerative diseases of present times is hardening of the arteries or arteriosclerosis. Many investigations have been and are being directed to understanding its causes and finding satisfactory means and methods of treatment. In spite of considerable progress its etiology is not yet completely understood; it appears likely, however, that hardening of the artery walls is preceded by atherosclerosis, or the deposit of cholesterol plaques on the intimae or inner surfaces of the arterial lumen.

Efforts have been made to prevent or alleviate this condition by utilizing the known lipotropic action of choline. This has been used in conjunction with inositol (i-inositol) because of the known favorable effect of inositol on the lipotropic action of choline. ("The Biochemistry of Inositol," E. R. Weidlein, Jr., Mellon Institute, Pittsburgh, Pa., 1951, page 27.) As far as I know, none of these attempts have yielded certain and consistently satisfactory results. See, for example, Herrmann, G. R., Texas State J. of Med. 42, 260–263 (1946) and Queries and Minor Notes, J. A. M. A., September 8, 1951, vol. 147, No. 2, page 205.

An indication of incipient or active atherosclerosis is a high cholesterol blood level. While the cholesterol blood level in normal individuals varies within wide limits, if it exceeds 300 mg. percent, danger of atherosclerosis is indicated. There is, however, one qualifying factor, namely, the ratio of phosphatides to cholesterol in the blood. If this ratio is greater than 1, a somewhat higher cholesterol level can, it is believed, be tolerated without adverse effect.

It is the object of this invention to provide a therapeutic composition effective in reducing the cholesterol blood level and in producing a phosphatide:cholesterol ratio in the blood having a value of 1 or more, thereby alleviating or preventing atherosclerosis.

I have discovered that a composition containing a surface-active agent in conjunction with choline and inositol has the ability, when administered orally, to reduce abnormally high blood cholesterol levels and to increase abnormally low phosphatide:cholesterol ratios in the blood.

The reason for the effectiveness of my composition in treating atherosclerosis is not well understood. It appears to have been established that choline and inositol alone are effective in many cases in defatting fatty livers. (Pollak, Geriatics. September–October 1951, p. 309.) According to Pollak's theory, the alleviation of atherosclerosis is primarily due to this defatting action, which restores the liver to normal functioning.

It has also been established that the surface-active agent polyoxyethylene sorbitan monooleate ("Tween 80," Atlas Powder Company) is a very effective agent in increasing fat absorption and does not affect blood cholesterol levels. (Krantz et al., Bull. School of Med., Univ. of Md., 36 (1951), 48–56.)

In view of these facts it is surprising and unexpected that in my compositions a surface-active agent which facilitates fat absorption should greatly augment the beneficial effects of choline and inositol in reducing the blood cholesterol level and make this combination a reliable therapeutic agent for treating hypercholesteremia and thus alleviating atherosclerosis.

According to my invention I provide an aqueous solution containing choline, preferably as a salt such as the di-hydrogen citrate, a non-toxic surface-active agent and inositol. Such a solution is intended for oral administration and I have found it convenient to use concentrations yielding one dose per teaspoonful (5 ml.). I may also introduce glycerol to prevent gelling and reduce viscosity, flavoring materials such as saccharin, sucrose and oil of orange, and preservatives such as sodium benzoate and sodium propionate; these ingredients, while usually desirable, are not essential.

A preferred surface-active agent for use in my preparation is polyoxyethylene sorbitan monooleate (e. g. "Tween 80" produced by the Atlas Powder Company). This product is satisfactory because (a) of its proved non-toxicity, (b) of its favorable hydrophilic-lipophilic balance, and (c) it gives optically clear solutions to the naked eye. Other surface-active agents, however, may be substituted and the clarity of the solution is more of an esthetic than practical requirement provided there is no actual settling of sediment. Among other usable surface-active agents are:

Non-ionic:
    Polyoxyethylene sorbitan monolaurate _____ ("Tween 20") (Atlas).
    Polyoxyethylene sorbitan trioleate _____ ("Tween 85") (Atlas).
    Polyoxyethylene sorbitol pentaoleate _____ ("C–1205") (Atlas).

One preferred embodiment of my invention has the following composition:

| Ingredient | Unit | Amount |
|---|---|---|
| Choline di-hydrogen citrate (equivalent to 4.10 g. choline base) | g. | 10.0 |
| i-Inositol | g. | 5.0 |
| Polyoxyethylene derivative of sorbitan monooleate ("Tween 80") | g. | 10.0 |
| Glycerol | g. | 20.0 |
| Sodium saccharin | g. | 0.15 |
| Sucrose (starch-free) | g. | 5.0 |
| Oil of orange (terpeneless) | ml. | 0.1 |
| Sodium benzoate | g. | 0.1 |
| Sodium propionate | g. | 0.1 |
| NaOH to approximately | pH | 4 |
| Water to 100 ml. | | |

This preparation is a clear, light amber, relatively non-viscous liquid, of pleasant taste, which disperses rapidly in the saliva when taken orally. It will provide a dose of 0.5 g. choline di-hydrogen citrate (0.2 g. choline base) and 0.25 g. inositol and 0.5 g. "Tween 80" per teaspoonful (5 ml.). It has good shelf life. As pointed out above, the essential ingredients are the choline, inositol and surface-active agent. The glycerol reduces viscosity, the saccharin, sucrose and oil of orange are added for flavor, and the benzoate and propionate respectively inhibit fermentation and mold growth. The pH is adjusted to a favorable value for stability and palatability. While each ingredient has a specific function in providing a preparation of pleasant consistency and taste and of good shelf life, from the physiological point of view the glycerol, the flavoring materials, the preservatives and the pH adjustment may be omitted without seriously impairing the efficacy of the preparation.

The relative amounts of the ingredients may be varied considerably from the above listed amounts, provided they are kept within appropriate solubility limits. The "Tween 80" may vary from about 10 g. to about 40 g. per 100 ml. of preparation depending on the concentration of the choline salt used. The choline base and inositol may be reduced to any desired therapeutic minimum and may be respectively as high as 25 g. and 12.5 g. or more per 100 ml. The flavoring materials and preservatives may obviously be widely varied, omitted or replaced by substitutes, and the pH may, within reasonable palatability limits, range from 3 to 7. The choline may be present as the free base, or other salts than the di-hydrogen citrate may be used, e. g. the hydrochloride, the tricitrate, the bitartrate.

In making up my preparation I prefer to dissolve the choline or choline salt, inositol, saccharin, sucrose and sodium benzoate and propionate in water, e. g. 36 ml.

water, with gentle warming, and then add the glycerol. I then separately dissolve the oil of orange in the "Tween 80." I mix the two solutions, bring them to pH 4 with a small amount of 50 percent NaOH, and finally dilute with water to 100 ml.

My preparation may also be given in capsule form, the capsule containing only choline or a choline salt, inositol and surface-active agent. Each capsule may, for example, contain 0.25 g. choline di-hydrogen citrate 0.125 g. inositol and 0.25 g. surface-active agent.

In therapeutic use my preferred compound, described above, is usually administered in divided doses of three to four teaspoonfuls per day, providing approximately 0.6 g. to 0.8 g. choline base, 0.75 g. to 1.0 g. inositol and 1.5 g. to 2.0 g. "Tween 80" per day. This course of treatment usually lasts for one or two weeks, after which a maintenance dosage regime may be followed or medication may be stopped altogether, depending on the reaction of the patient. In some cases the reduced blood cholesterol level is maintained for considerable periods without maintenance medication, and in some cases, especially where complications are involved, a longer period of administration is required.

The results obtained by the administration of my preferred composition described above to four hypercholesteremic patients are tabulated on the following pages. They may be considered typical.

CASE 1

| Duration of Observation, days | Blood Cholesterol, mg. percent | Lipoid Phosphorus, mg. percent | Phosphatide, mg. percent (Lipoid PX25) | Phosphatide/Cholesterol Ratio |
|---|---|---|---|---|
| 0 | 321.1 | 7.80 | 195 | 0.61 |
|   | Medication started | | | |
| 1 | 315.9 | 8.82 | 221 | 0.70 |
| 8 | 176.8 | 8.81 | 220 | 1.24 |
|   | Left hospital; medication continued | | | |
| 21 | 204.1 | 7.80 | 195 | 0.96 |
| 28 | 224.9 | 9.16 | 229 | 1.02 |
| 35 | 211.9 | 9.57 | 239 | 1.13 |
|   | Medication consisted of 1 teaspoonful of my preferred composition 4 times daily | | | |

CASE 2

| Duration of Observation, days | Blood Cholesterol, mg. percent | Lipoid Phosphorus, mg. percent | Phosphatide, mg. percent (Lipoid PX25) | Phosphatide/Cholesterol Ratio |
|---|---|---|---|---|
| 0 | 672.7 | 8.41 | 210 | 0.31 |
|   | Medication started | | | |
| 8 | 346.2 | 10.87 | 272 | 0.79 |
| 16 | 336.7 | 11.77 | 294 | 0.87 |
|   | Left hospital; medication stopped | | | |
| 22 | 300.3 | 11.40 | 285 | 0.95 |
| 28 | 280.8 | 10.19 | 255 | 0.91 |
| 35 | 295.1 | 11.83 | 296 | 1.00 |
| 42 | Medication as in Case 1 | | | |

CASE 3

| 0 | 353.6 | 9.1 | 228 | 0.64 |
|---|---|---|---|---|
|   | Medication started | | | |
| 7 | 337.4 | 8.58 | 215 | 0.64 |
| 15 | 254.8 | 8.84 | 221 | 0.87 |
| 21 | 292.5 | 10.4 | 260 | 0.89 |
| 30 | 262.6 | 11.4 | 285 | 1.09 |
| 34 | Discharged from hospital; Medication as in Case 1 | | | |

CASE 4

| 0 | 300.1 | 8.86 | 222 | 0.74 |
|---|---|---|---|---|
|   | Medication started | | | |
| 1 | | | | |
| 12 | 256.1 | 9.57 | 234 | 0.91 |
| 21 | 215.8 | 11.4 | 285 | 1.32 |
|   | Discharged to Chronic Diseases Hospital | | | |

These patients were selected for treatment because they were diabetic and consequently prone to hyperlipemia and subsequent atherosclerosis. Cases 1, 2 and 3 had blood cholesterol levels well above the normal maximum of 300 mg. percent. While the cholesterol level of Case 4 was substantially 300, the low ratio of phosphatide to total cholesterol indicated treatment. In all cases a substantial reduction of blood cholesterol was achieved; in Case 1 this was noted after 14 days of medication, in Case 2 after 8 days, in Case 3 after 14 days and in Case 4 after 11 days. The improvement was maintained during the period of observation, in Case 2 for 20 days after discontinuance of medication. In all cases the circulatory condition of the patients was improved.

In all cases also the phosphatide level was increased and the phosphatide:cholesterol ratio was raised to 1 or more. This is considered remarkable in view of the usual stability and constancy of the human blood phosphatide levels.

Treatment of numerous other patients has yielded similar results.

As far as I know no other choline preparation has produced results as consistently favorable in correcting hypercholesteremia.

In the specification and claims the term "choline" is used in its broad sense to include choline base and the therapeutic salts of choline unless otherwise specified. The term "dissolved" is used in a broad sense to include colloidal as well as molecular solution.

I claim:

1. A therapeutic preparation for oral administration which comprises an aqueous solution containing inositol, choline in a therapeutically-effective concentration, and a surface active agent comprising a polyoxyethylene sorbitan higher fatty acid ester dissolved therein, said surface active agent being present in an amount ranging from about 10 grams to about 40 grams for each 100 milliliters of solution.

2. A therapeutic preparation for oral administration which comprises an aqueous solution containing choline and inositol in a therapeutically-effective concentration and a surface active agent comprising polyoxyethylene sorbitan monooleate dissolved therein, said surface active agent being present in an amount ranging from about 10 grams to about 40 grams for each 100 milliliters of solution.

3. A therapeutic preparation for oral administration which comprises an aqueous solution containing choline and inositol in a therapeutically-effective concentration and a surface active agent comprising polyoxyethylene sorbitan monolaurate dissolved therein, said surface active agent being present in an amount ranging from about 10 grams to about 40 grams for each 100 milliliters of solution.

4. A therapeutic preparation for oral administration which comprises an aqueous solution containing choline and inositol in a therapeutically-effective concentration and a surface active agent comprising polyoxyethylene sorbitan trioleate dissolved therein, said surface active agent being present in an amount ranging from about 10 grams to about 40 grams for each 100 milliliters of solution.

5. A therapeutic preparation for oral administration which consists of a capsule containing a therapeutic amount of choline and inositol and 0.25–0.7 g. of a polyoxyethylene sorbitan higher fatty acid ester.

References Cited in the file of this patent

UNITED STATES PATENTS

| Number | Name | Date |
|---|---|---|
| 2,407,624 | Bird | Sept. 17, 1946 |
| 2,417,299 | Freedman | Mar. 11, 1947 |

OTHER REFERENCES

U. S. Dispensatory, 24th ed. (1947), pp. 1400, 1401, 1488, 1489.

Griffith: Am. Jour. of Pharmacy, January 1937, pp. 18 to 24.

Howard: Modern Drug Encyclopedia, 4th ed. (1949), page 528.

Modern Drugs, April 1949, page 112.